United States Patent
Li

(10) Patent No.: US 12,437,368 B2
(45) Date of Patent: Oct. 7, 2025

(54) IMAGE FUSION METHOD, ELECTRONIC DEVICE, UNMANNED AERIAL VEHICLE AND STORAGE MEDIUM

(71) Applicant: AUTEL ROBOTICS CO., LTD., Shenzhen (CN)

(72) Inventor: Zhaozao Li, Shenzhen (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 243 days.

(21) Appl. No.: 18/231,182

(22) Filed: Aug. 7, 2023

(65) Prior Publication Data

US 2024/0212101 A1 Jun. 27, 2024

(30) Foreign Application Priority Data

Aug. 5, 2022 (CN) .......................... 202210939940.1

(51) Int. Cl.
| | |
|---|---|
| G06T 5/50 | (2006.01) |
| G06V 10/44 | (2022.01) |
| G06V 10/60 | (2022.01) |
| G06V 10/75 | (2022.01) |

(52) U.S. Cl.
CPC ................ G06T 5/50 (2013.01); G06V 10/44 (2022.01); G06V 10/60 (2022.01); G06V 10/751 (2022.01); *G06T 2207/10048* (2013.01); *G06T 2207/20221* (2013.01)

(58) Field of Classification Search
CPC ........ G06T 5/50; G06V 10/60; G06V 10/751; G06V 10/44
USPC ....................................................... 345/629
See application file for complete search history.

(56) References Cited

U.S. PATENT DOCUMENTS

| | | | | |
|---|---|---|---|---|
| 8,836,793 | B1* | 9/2014 | Kriesel | H04N 23/11 |
| | | | | 348/164 |
| 2014/0285673 | A1* | 9/2014 | Hundley | H04N 23/11 |
| | | | | 382/103 |
| 2020/0364456 | A1* | 11/2020 | Tran | G06T 7/0004 |
| 2022/0207337 | A1* | 6/2022 | Kim | G06N 3/048 |

FOREIGN PATENT DOCUMENTS

| | | |
|---|---|---|
| CN | 107230199 A | 10/2017 |
| CN | 112288761 A | 1/2021 |
| CN | 113570530 A | 10/2021 |
| CN | 114742866 A | 7/2022 |

OTHER PUBLICATIONS

CN First Office Action issued in Application No. CN202210939940.1, dated Jun. 19, 2025, with English translation, (12p).

* cited by examiner

*Primary Examiner* — Thomas J Lett
(74) *Attorney, Agent, or Firm* — Arch & Lake LLP

(57) ABSTRACT

Embodiments of this disclosure provide an image fusion method, an electronic device, an unmanned aerial vehicle and a non transitory compute readable storage medium. The image fusion method includes: acquiring a first image; acquiring a second image; acquiring a mapped image of the first image based on a first transformation parameter and the first image, the first transformation parameter being used for characterizing a spatial transformation relationship between the first image and the second image; and weightedly superposing the second image and the mapped image to acquire a first fused image.

19 Claims, 15 Drawing Sheets

First image          Second image

IMAGE FUSION METHOD, ELECTRONIC DEVICE, UNMANNED AERIAL VEHICLE AND STORAGE MEDIUM

CROSS REFERENCE TO RELATED APPLICATION

This application claims priority of Chinese Patent Application No. 202210939940.1, filed on Aug. 5, 2022, and entitled as "An image fusion method, an electronic device, an unmanned aerial vehicle and a non-transitory computer-readable storage medium," the entire disclosure of which is incorporated herein by reference for all purposes.

BACKGROUND

Low-light-level imaging and thermal imaging are both good low-light imaging techniques. In thermal infrared imaging, infrared radiation emitted by a target is received by a radiometer and converted into a visible thermal infrared image. The thermal infrared imaging is sensitive to temperature and can detect targets with temperature difference well, which enjoys a long detection distance and is not affected by environment, lights, tree shielding and so on. However, it is insensitive to brightness changes, which results in low resolution of low-light-level images and limited ability to depict details. It is impossible to realize identification or detection of detailed features such as license plates and human appearance.

The low-light-level imaging is reflective imaging, with visual perception close to visible light, which can well identify objects with different reflectivity for visible light. Low-light-level images are rich in details and have strong sense of depth. However, the low-light-level imaging is greatly influenced by weather, light sources, smoke and other factors, which is unstable and may even fail to operate in rainy and foggy days or in dark environment.

SUMMARY

The present disclosure relates to the field of image processing, in particular to an image fusion method, an electronic device, an unmanned aerial vehicle and a non-transitory compute-readable storage medium.

According to a first aspect of the present disclosure, some embodiments provide an image fusion method, which includes:
  acquiring a first image;
  acquiring a second image;
  acquiring a mapped image of the first image based on a first transformation parameter and the first image, the first transformation parameter being configured to characterize a spatial transformation relationship between the first image and the second image; and
  weightedly superposing the second image and the mapped image to acquire a first fused image.

According to a second aspect of the present disclosure, some embodiments provide an electronic device, which includes:
  a processor and a memory in communication connection with the processor.
  The memory is stored with computer program instructions, which, when called by the processor, cause the processor to execute the method as described above.

According to a third aspect of the present disclosure, some embodiments provide an unmanned aerial vehicle, which includes:

a fuselage provided with a first imaging device and a second imaging device, the first imaging device being used for acquiring a first image and the second imaging device being used for acquiring a second image;
an arm being connected with the fuselage;
a power device arranged on the arm and for providing power for flying of the unmanned aerial vehicle; and
a processor and a memory in communication connection with the processor.

The memory is stored with computer program instructions, which, when called by the processor, cause the processor to execute the method as described above.

According to a fourth aspect of the present disclosure, some embodiments provide a storage medium, which stores computer-executable instructions to cause the processor to perform the method as described above.

BRIEF DESCRIPTION OF THE DRAWINGS

One or more examples are exemplarily described with reference to the corresponding figures in the accompanying drawings, and the descriptions are not to be construed as limiting the examples. Elements in the accompanying drawings that have same reference numerals are represented as similar elements, and unless otherwise particularly stated, the figures in the accompanying drawings are not drawn to scale.

DETAILED DESCRIPTION

To make the objectives, technical solutions, and advantages of the examples of this disclosure more comprehensible, the following clearly and in detail describes the technical solutions in the examples of this disclosure with reference to the accompanying drawings in the examples of this disclosure. Apparently, the described examples are a part rather than all of the examples of this disclosure. It should be understood that the specific examples described herein are merely used to explain this disclosure but are not intended to limit this disclosure.

In addition, technical features involved in examples of this disclosure that are described below may be combined with each other provided that no conflict occurs.

In addition, although functional modules are divided in the schematic diagram of the device and a logical order is shown in the flowchart, in some cases, steps which may be different from those shown or described may be performed in module division different from that in the device or in an order different from that in the flowchart. In addition, words "first", "second" and "third" used in this specification do not limit data and execution order, but only distinguish same or similar items with basically same function and effect.

Unless otherwise defined, meanings of technical and scientific terms used in this specification are the same as those usually understood by a person skilled in the art. In this disclosure, terms used in the specification of this disclosure are merely intended to describe specific examples, but are not intended to limit this disclosure. A term "and/or" used in this specification includes any or all combinations of one or more related listed items.

An electronic device often uses a variety of imaging devices to acquire images, the variety of imaging devices are based on different imaging technologies, so that images acquired by the electronic device can integrate advantages of various imaging technologies and make up for each other's shortcomings.

Image fusion serves to combine images from different imaging devices to get a more complete image or scene, which improves information volume and clarity of images by processing complementary information between multiple images.

Figure 1:
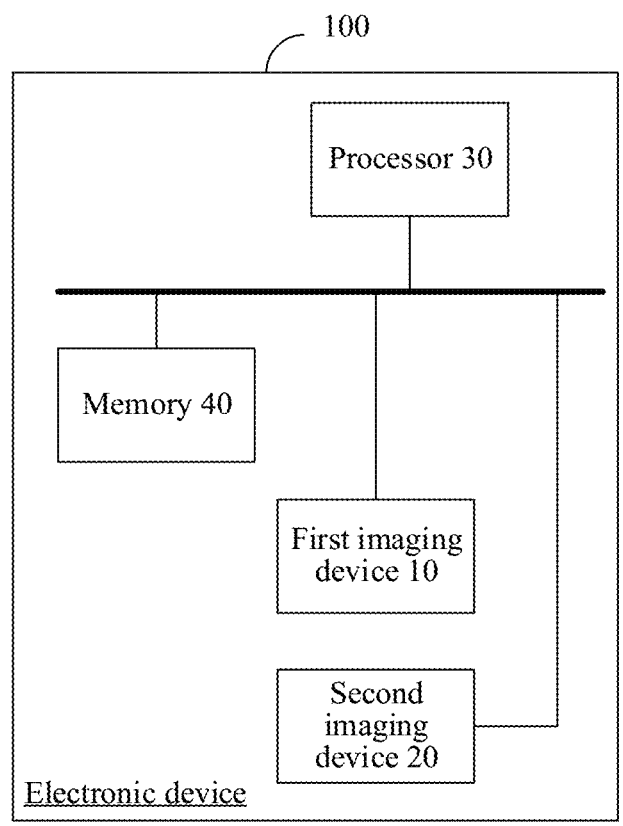
FIG. 1 is a schematic structural diagram of an electronic device according to an example of this disclosure.

FIG. 1 shows a structure of an electronic device 100 by taking two imaging devices as examples. The electronic device 100 includes a first imaging device 10 and a second imaging device 20. The first imaging device 10 is used for acquiring a first image and the second imaging device 20 is used for acquiring a second image.

The electronic device further includes a processor 30 and a memory 40. The first imaging device 10 and the second imaging device 20 are both connected to the processor 30 in communication, and the processor 30 and the memory 40 are connected by a wire. In the example shown in FIG. 1, the first imaging device 10, the second imaging device 20 and the memory 30 are all connected to the processor 40 by a bus.

The memory 40 is used for storing software programs, computer-executable program instructions, and the like. The memory 40 may include a storage program area and a storage data area. The storage program area may store an operating system and an application program required by at least one function. The storage data area can store data created according to use of electronic device and the like.

The memory 40 can be a read-only memory (ROM), or other types of static storage devices that can store static information and instructions; or a random access memory (RAM), or other types of dynamic storage devices that can store information and instructions; or it can also be an electrically erasable programmable read-only memory (EEPROM), which is not specifically limited here.

Illustratively, the memory 40 described above may be a double-rate synchronous dynamic random access memory DDRSDRAM (DDR for short). The memory 40 may exist independently, but is connected with the processor 30. Alternatively, the memory 40 may be integrated with the processor 30. For example, the memory is integrated in one or more chips.

In some examples, the memory 40 optionally may include memories remotely disposed relative to the processor 30, and the remote memories may be connected to the electronic device through a network. Examples of the network include, but are not limited to, the Internet, an intranet, a local area network, a mobile communication network, and a combination thereof.

The processor 30 connects all parts of the entire electronic device 100 with various interfaces and lines, and executes various functions of the electronic device and processes data by running or executing software programs stored in the memory 40 and calling data stored in the memory 40, such as image processing of the first image and the second image and fusing of the first image and the second image to obtain a fused image. The processor 30 can realize the method described in any example of this disclosure.

The processor 30 may be a functional unit or functional module with the image processing function such as a field programmable gate array (FPGA), a digital signal processor (DSP), a central processing unit (CPU) or a graphics processing unit (GPU).

The processor 30 may be a single-core processor or a multi-core processor. For example, the processor 30 may be composed of multiple FPGAs or multiple DSPs. Furthermore, the processor 30 may refer to one or more devices, circuits and/or processing cores for processing data (e.g., computer program instructions). The processor 30 can be a separate semiconductor chip, or it can be integrated into a semiconductor chip together with other circuits. For example, it can form a system-on-a-chip (SoC) with other circuits (such as codec circuits, hardware acceleration circuits or various buses and interface circuits); or it can be integrated into an application specific integrated circuit (ASIC) as a built-in processor thereof, and the ASIC integrated with the processor can be packaged separately or together with other circuits.

The first imaging device 10 and the second imaging device 20 may be imaging devices based on different imaging technologies, so that the electronic device has advantages of both imaging technologies. The first imaging device 10 and the second imaging device 20 can be various thermal imaging devices and optical imaging devices, such as infrared thermal imagers, low-light night vision devices, charge coupled device (CCD) image sensors, and complementary metal-oxide semiconductor (CMOS) image sensors.

The electronic device includes all kinds of instruments and equipment composed of electronic components such as integrated circuits, transistors and electron tubes, such as various unmanned aerial vehicles, various robots, camera equipment and intelligent terminals.

Figure 2:
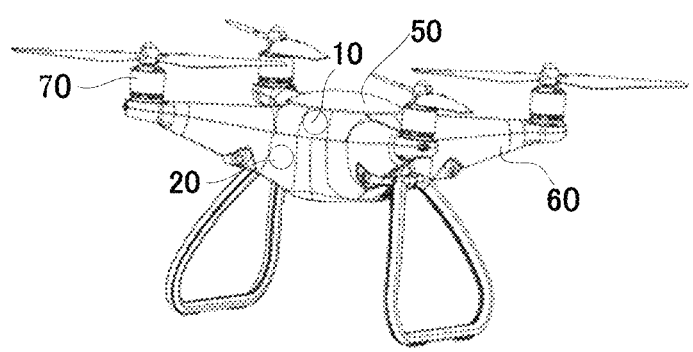
FIG. 2 is a structural schematic diagram of an unmanned aerial vehicle according to an example of this disclosure.

FIG. 2 shows a structure of an unmanned aerial vehicle when the electronic device is an unmanned aerial vehicle, and the method of respective examples of this disclosure can also be applied to the unmanned aerial vehicle. As shown in FIG. 2, the unmanned aerial vehicle 100 includes a fuselage 50, an arm 60 connected to the fuselage 50, a power device 70 provided on the arm 60, and a first imaging device 10 and a second imaging device 20 provided on the fuselage 50.

In this example, the first imaging device 10 and the second imaging device 20 are arranged on the fuselage 50, and in other examples, they can also be arranged at other positions of the unmanned aerial vehicle, such as at the arm. FIG. 2 only schematically shows that the unmanned aerial vehicle includes one first imaging device 10 and one second imaging device 20. In some application scenarios, the first imaging device 10 and the second imaging device 20 can be set in multiple directions, for example, the first imaging device 10 and/or the second imaging device 20 can be set in four, six or eight directions respectively.

The power device 70 includes, for example, a motor and a propeller connected with the motor, and a rotating shaft of the motor rotates to drive the propeller to rotate so as to provide lift for the unmanned aerial vehicle.

In some other examples, the unmanned aerial vehicle 100 may also include a vision system (not shown) for acquiring images of a surrounding environment, identifying targets, detecting depth information of the targets, acquiring environmental maps, or the like. The vision system may include a vision chip.

The unmanned aerial vehicle can also include a flight controller (not shown), which is a control center of the unmanned aerial vehicle, and is used for coordinating and controlling various components or elements of the unmanned aerial vehicle to realize various functions of the unmanned aerial vehicle, such as flying, landing, shooting and tracking targets.

When the electronic device is an unmanned aerial vehicle, the processor 30 is a processor in the unmanned aerial vehicle, and the memory 40 is an internal memory in the unmanned aerial vehicle, or an external memory connected with the unmanned aerial vehicle in communication. The method of respective examples of this disclosure can be executed by the flight controller in an unmanned aerial vehicle, by a vision chip in a vision system, or by other controllers in the unmanned aerial vehicle, or by two or more controllers in coordination to realize the method of any example of this disclosure.

It can be understood by those skilled in the art that the above is only an example of a hardware structure of the unmanned aerial vehicle 100. In practical applications, more components can be provided for the unmanned aerial vehicle 100 according to actual functional requirements, and of course, one or more of them can be omitted according to functional requirements.

The unmanned aerial vehicle can be any suitable type of unmanned aerial vehicle, such as a fixed-wing unmanned aerial vehicle, a rotary-wing unmanned aerial vehicle, an unmanned airship and an unmanned hot air balloon.

The first imaging device 10 and the second imaging device 20 are taken as thermal infrared imaging devices (such as infrared thermal imagers) and low-light-level imaging devices (such as low-light-level night vision devices) for illustration.

Low-light-level imaging and thermal imaging are both good low-light imaging techniques. In thermal infrared imaging, infrared radiation emitted by a target is received by a radiometer and converted into a visible thermal infrared image. The thermal infrared imaging is sensitive to temperature and can detect targets with temperature difference well, which enjoys a long detection distance and is not affected by environment, lights, tree shielding and so on. However, it is insensitive to brightness changes, which results in low resolution of thermal infrared images and limited ability to depict details. It is impossible to realize identification or detection of detailed features such as license plates and human appearance.

The low-light-level imaging is reflective imaging, with visual perception close to visible light, which can well identify objects with different reflectivity for visible light. Low-light-level images are rich in details and have strong sense of depth. However, the low-light-level imaging is greatly influenced by weather, light sources, smoke and other factors, which is unstable and may even fail to operate in rainy and foggy days or in dark environment.

Fusion images obtained by fusing the low-light-level image and the thermal infrared image can integrate their advantages, which cannot only exhibit rich details of the low-light-level images, but also provide infrared radiation images different from reflectance images, thus greatly improving observation capability of low-light video images.

At present, image fusion methods, such as an image fusion method based on pyramid decomposition and an image fusion method based on wavelet analysis, are mostly complicated. In the image fusion method provided by respective examples of this disclosure, the mapped image of the first image is obtained through the first transformation parameters and the first image, and the mapped image is spatially aligned with the second image. Then, the second image and the mapped image are weighted superimposed, and thus the fused image can be obtained. This fusion method is simple and can improve a running speed of software.

Figure 3:
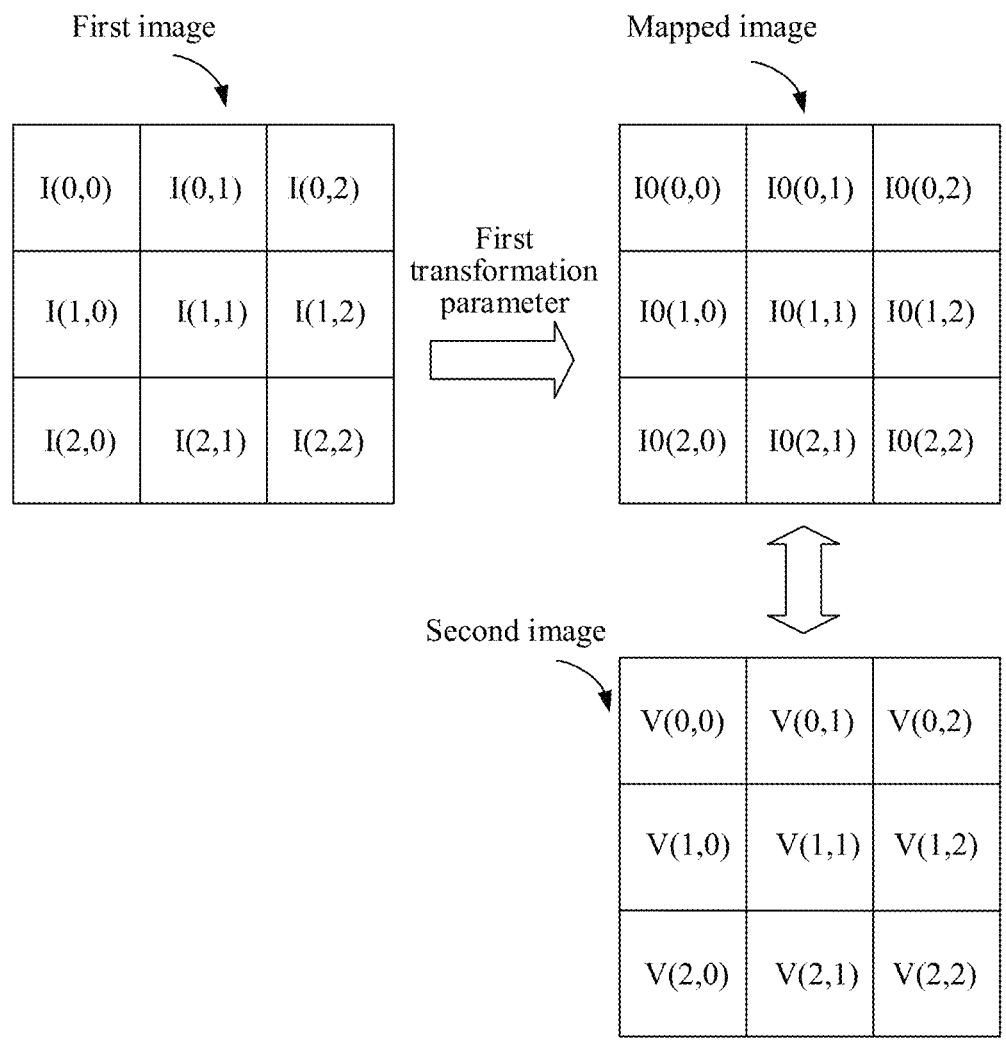
FIG. 3 is a schematic diagram of an inventive principle of an example of this disclosure.

Referring to FIG. 3. Both the first image and the second image include M rows and N columns of pixels, each having a pixel value. A position of the pixel can be expressed by pixel coordinates, which can be an array sequence value arranged in sequence to represent a position of each pixel in the image. As shown in FIG. 3, (0,0), (0,1) . . . (2,2) in FIG. 3 are all pixel coordinates.

A pixel value is a value given by a computer when the image is digitized, which represents average brightness information of a pixel in the image. The images involved in respective examples of this disclosure can be single-channel images or three-channel images, and can also be four-channel images or other images with more channels.

The single-channel image is also called a grayscale image, and each pixel is represented by a pixel value. If the pixel value of the single-channel image is represented by 8 bits, the pixel value of the single-channel image ranges from 0 (black) to 255 (white). The three-channel image generally refer to RGB images, which can present color images or represent black-and-white images. If the pixel values of three-channel images are represented by 8 bits, each pixel value is represented by three channel values, that is, the pixel values are represented by superposition of red (0~255), green (0~255) and blue (0~255). The four-channel image is obtained by adding a brightness channel to the three-channel image to represent transparency.

It can be understood by those skilled in the art that if an image is a multi-channel image, a pixel value of a pixel is composed of multiple channel values, and same calculation is required for each channel value in a calculation process.

The mapped image is spatially aligned with the second image, and it can be understood that respective pixels in the mapped image have corresponding relationships with respective pixels in the second image. That is, pixels at a same position in the mapped image and the second image is directed to a same feature point. The pixels at the same position in the spatially aligned mapped image and the second image correspond to each other, and respective pixel values can be directly weighted superimposed so as to obtain the first fused image.

In the example of this disclosure, in order to achieve spatial alignment between the mapped image of the first image and the second image, it is not to directly change coordinates of a respective pixel in the first image, but to change pixel values of the respective pixel in the first image so as to achieve effect of position shift (e.g., coordinate change), so that the obtained mapped image is spatially aligned with the second image.

In the example of this disclosure, the pixel value of the respective pixel is changed with the first transformation parameter. Taking FIG. 3 as an example, after the first image I(x,y) is transformed with the first transformation parameter, a mapped image I0(x,y) corresponding to the second image V(x,y) is obtained. After respective pixels I(0,0), I(0,1) . . . I(2,2) of the first image is transformed with the first transformation parameter, pixel values of the respective pixels become I0(0,0), I0(0,1) . . . I0(2,2), and I0(0,0), I0(0,1) . . . I0(2,2) in the mapped image I0(x,y) correspond to V(0,0), V(0,1) . . . V(2,2) in the second image V(x,y), respectively.

The image fusion methods of respective examples of this disclosure will be described below. For convenience of explanation, the electronic device is taken as an unmanned aerial vehicle, respective images as single-channel images, and the pixel value as a gray value for illustration.

Figure 4:
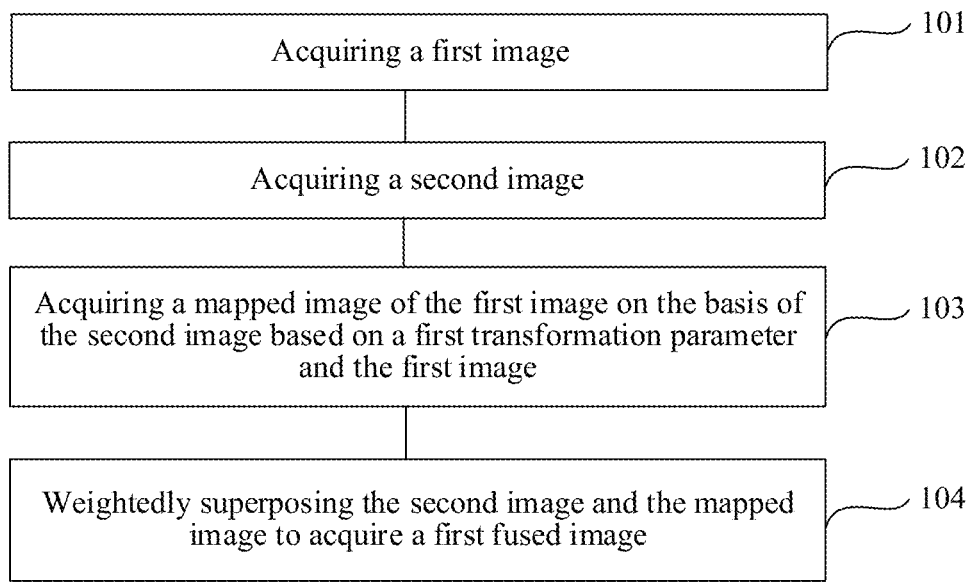
FIG. 4 is flowcharts of an image fusion method according to an example of this disclosure.

As shown in FIG. 4, the image fusion method according to the example of this disclosure includes following steps.

101: A first image is acquired.

102: A second image is acquired.

The first image can be a thermal infrared image obtained by a thermal infrared imaging device, and the second image may be a low-light-level image obtained by a low-light-level imaging device. In other examples, the first image can also be a low-light-level image obtained by a low-light-level imaging device, and the second image can also be a thermal infrared image obtained by a thermal infrared imaging device. It can be understood by those skilled in the art that the first image and the second image can also be any images based on different imaging technologies.

103: A mapped image of the first image is acquired based on a first transformation parameter and the first image.

After the first image is acquired, and the first image is transformed based on the first transformation parameter, so that the mapped image of the acquired first image is aligned with the second image in a spatial structure, that is, the mapped image has a corresponding relationship with the second image in pixels at a same position. In this way, the mapped image and the second image can be fused by direct weighted addition, and this method is simple.

The first transformation parameter is configured to describe, indicate, or characterize a spatial transformation relationship between the first image and the second image. After the first image is transformed with the first transformation parameter, the obtained mapped image is spatially aligned with the second image.

The first transformation parameter is, for example, a projection matrix, which can be a matrix of any size. Illustratively, the projection matrix is:

$$H = \begin{bmatrix} m_0, m_1, m_2 \\ m_3, m_4, m_5 \\ m_6, m_7, m_8 \end{bmatrix}$$

where $m_0$, $m_1$, $m_3$ and $m_4$ respectively represent a scaling scale and rotation amount of an image, $m_2$ represents displacement of the image in a horizontal direction, $m_5$, represents displacement of the image in a vertical direction, $m_6$ and $m_7$ represent deformation of the image in the horizontal and vertical directions, $m_8$ is a weight factor, and in some applications, $m_8$ is 1 under a normalization condition.

Respective parameters in the projection matrix can be obtained by calibration. Taking the first image as the thermal infrared image and the second image as the low-light-level image for illustration, a calibration pattern with texture information basically the same in thermal infrared imaging and low-light-level imaging can be selected, so as to facilitate subsequent feature point matching.

A general process of obtaining the projection matrix is that the thermal infrared imaging device and the low-light-level imaging device take images at a certain distance (for example, 6 meters, hereinafter referred to as a basic distance) from the calibration pattern to obtain a first calibration image and a second calibration image. Feature points in the first calibration image and the second calibration image are extracted respectively, and the feature point matching is performed to obtain a plurality of matched feature point pairs. Then, based on horizontal and vertical coordinates of respective matching feature point pairs, values of the respective parameters m0 to m7 in the projection matrix are calculated.

Specifically, Feature points such as edges and profiles in the first calibration image and the second calibration image can be extracted for the feature point matching so as to obtain respective matched feature point pairs. A Canny edge detection algorithm can be used for detecting the feature points such as edges and profiles in the images. In addition, other feature point matching methods in related art can be used for feature point matching.

In practical applications, for each electronic device, the projection matrix can be calibrated before leaving the factory and added to factory settings of the electronic device.

In some other examples, in order to improve matching accuracy of the mapped image and the second image and adapt to distance transformation from the target to the unmanned aerial vehicle, the projection matrix can also be:

$$H_L = \begin{bmatrix} m_0, m_1, (am_2 + bL) \\ m_3, m_4, (cm_5 + dL) \\ m_6, m_7, m_8 \end{bmatrix}$$

where L is a distance from a target to an imaging device, and a, b, c and d are constants, which can be obtained by calibration.

The projection matrix can be obtained based on the projection matrix H at the basic distance, L and parameters a, b, c and d can be obtained. As a distance between the thermal infrared imaging device and the low-light-level imaging device is generally the same, L can be a distance from the target to the thermal infrared imaging device or a distance from the target to the low-light-level imaging device.

In practical applications, there are many ways to obtain the distance from the target to the imaging device, such as laser ranging or radar ranging.

Under a condition that the first imaging device and the second imaging device are fixed, objects with different distances L are reflected on the image with change of displacement $m_2$ and $m_5$ in the horizontal and vertical directions. $m_2$ at a distance L is set to be $m_{2L}$ and $m_{5S}$ at the distance L is set to be $m_{5L}$.

Parameters a, b, c and d can be obtained by acquiring a plurality of parameter pairs of calibration distances L and m2L and a plurality of parameter pairs of calibration distances L and $m_{5L}$ and by linear fitting (for example, with a least square method). where $m_{2L}=am_2+bL$, that is, $m_{5L}=cm_5+dL$ at a distance L.

There are Multiple calibration distances, for example, 1 m, 2 m, 3 m . . . 100 m. During each measurement, a distance between the thermal infrared imaging device and the low-light-level imaging device is adjusted.

For example: when an interval calibration pattern between the thermal infrared imaging device and the low-light-level imaging device is 1 m, the first calibration image and the second calibration image are collected, and $m_{21}$ and $m_{51}$ are acquired in a same way as m0 to m7. Thus, parameter pairs (1, $m_{21}$) and (1, $m_{51}$) are obtained.

When the calibration pattern between the thermal infrared imaging device and the low-light-level imaging device is 2 m, the first calibration image and the second calibration image are collected and parameter pairs (2, $m_{22}$) and (2, $m_{52}$) are obtained.

Measurement is performed again at other calibration distances (for example, 3 m, 4 m, 5 m . . . 100 m), so as to obtain more parameter pairs.

Different electronic devices, that is, different thermal infrared imaging devices and low-light-level imaging devices, can also be used for obtaining more parameter pairs.

Then, the parameters a, b, c and d are obtained by linear fitting.

Taking the projection matrix H as an example, a mapping process of the first image is described below.

In the example of this disclosure, gray values of respective pixels in the first image are changed by the projection matrix, so as to achieve effect of position shift of respective pixels, so that the obtained mapped image is spatially aligned with the second image.

Assuming that the first image is I(x,y) and the mapped image is $I_0(x,y)$, a gray value of any pixel (x,y) in the mapped image can be obtained as follows:

a: firstly, gray values of a pixel at a same position and surrounding pixels in the first image are acquired. When the projection matrix is a 3×3 matrix, gray values of 9 pixels can be acquired. They form a 3×3 matrix as follows:

$$I1 = \begin{bmatrix} I_{(x-1,y-1)} & I_{(x,y-1)} & I_{(x+1,y-1)} \\ I_{(x-1,y)} & I_{(x,y)} & I_{(x+1,y)} \\ I_{(x-1,y+1)} & I_{(x,y+1)} & I_{(x+1,y+1)} \end{bmatrix}$$

b: I1 is multiplied with the projection matrix H, so as to also get a 3×3 matrix, which is:

$$N1 = \begin{bmatrix} I_{(x-1,y-1)} & I_{(x,y-1)} & I_{(x+1,y-1)} \\ I_{(x-1,y)} & I_{(x,y)} & I_{(x+1,y)} \\ I_{(x-1,y+1)} & I_{(x,y+1)} & I_{(x+1,y+1)} \end{bmatrix} \begin{bmatrix} m_0, m_1, m_2 \\ m_3, m_4, m_5 \\ m_6, m_7, m_8 \end{bmatrix}$$

c: $I_0(x,y)$ can be an average of 9 elements in N1.

Taking I0(1,1) in the mapped image as an example for illustration, I(0,0), I(0,1), I(0,2), I(1,0), I(1,1), I(1,2), I(2,0), I(2,1) and I(2,2) in the first image are acquired. Then $I_0(1,1)=(I(0,0)+I(0,1)+I(0,2)+I(1,0)+I(1,1)+I(1,2)+I(2,0)+I(2,1)+I(2,2))/9$.

The gray value of any pixel in the mapped image is calculated with the gray values of the pixel at the same position and the surrounding pixels in the first image, which can function in filtering and filter out influence of noise.

In some examples, pixels at an edge of the mapped image, such as pixels with coordinates of (0,0), (1,0), (2,0), (0,1) and (0,2), can directly be copied with gray values of their neighboring pixels without obtaining gray values.

In the above method, the gray values of the respective pixels in the mapped image can be obtained, thereby obtaining the mapped image.

It can be understood by those skilled in the art that the above is only an example of the projection and mapping process of the first image, which should not be understood as limitation of a projection and mapping mode. In other examples, the mapped image can also be obtained by using the projection matrix and in other ways.

104: The second image and the mapped image are weighted superposed to acquire a first fused image.

In some examples, the first fused image F(x,y) can be obtained by Formula (1):

$$F(x, y) = \sum_{x=0,y=0}^{x=w,y=h} [I_0(x, y) \cdot a + V(x, y) \cdot (1-a)] \quad (1)$$

where w is an image width, h is an image height, a is a weight, and V(x,y) is the second image.

F (1,1) and F (1,2) are taken as examples for illustration:

$$F(1, 1) = I_0(1, 1) * a + V(1, 1) * (1 - a)$$

$$F(1, 2) = I_0(1, 2) * a + V(1, 2) * (1 - a)$$

In some other examples, in order to make the fused image have more details and features, after the first fused image is obtained, a profile image can be acquired, and the first fused image and the profile image can be fused to obtain a second fused image. The second fused image fused with the profile image has richer features and details.

Figure 5A:
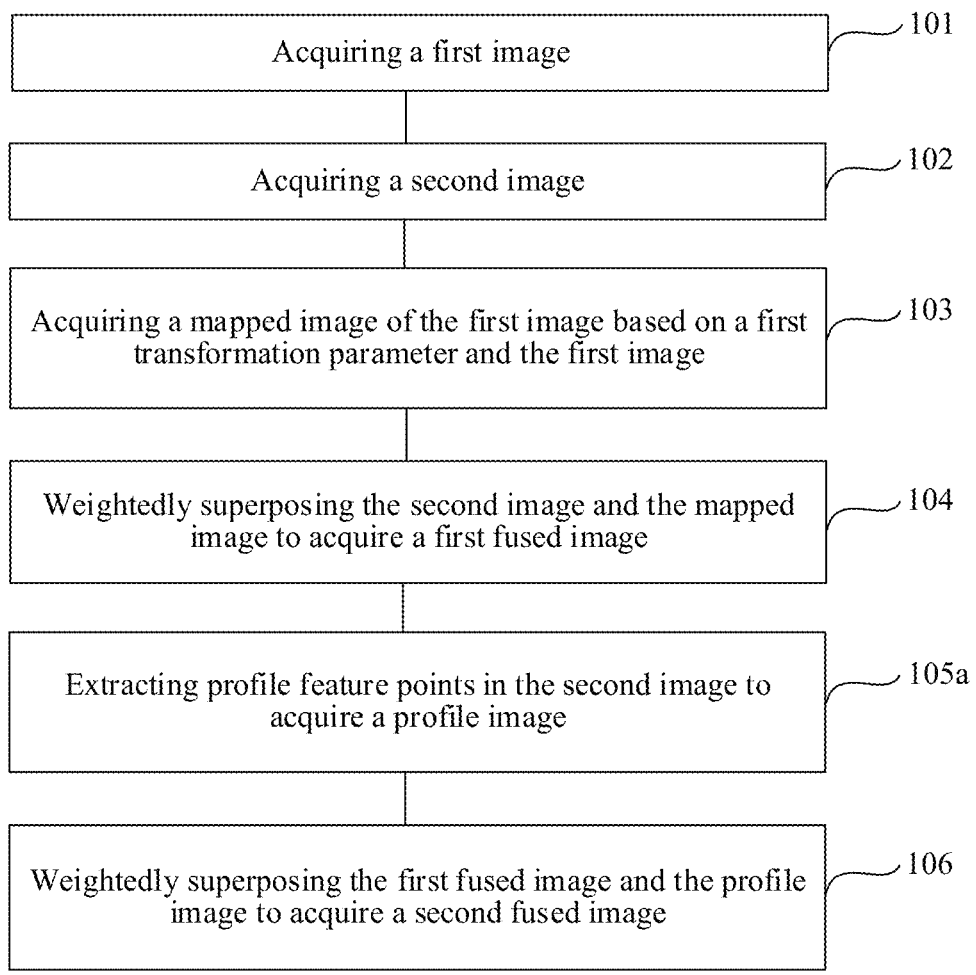
FIG. 5A is flowcharts of an image fusion method according to another example of this disclosure.

The first image can be used as the reference image, and the weight of the first image can be set to be greater than that of the second image (for needs of specific application, the weight of the first image can also be set to be less than that of the second image), and the profile image is derived from the second image. FIG. 5A can be referred for this example. The fusion method includes following steps.

101: A first image is acquired.

102: A second image is acquired.

103: A mapped image of the first image is acquired based on a first transformation parameter and the first image.

104: The second image and the mapped image are weighted superposed to acquire a first fused image.

105a: Profile feature points in the second image are extracted to acquire a profile image.

106: The first fused image and the profile image are weighted superposed to acquire a second fused image.

Figure 6A:
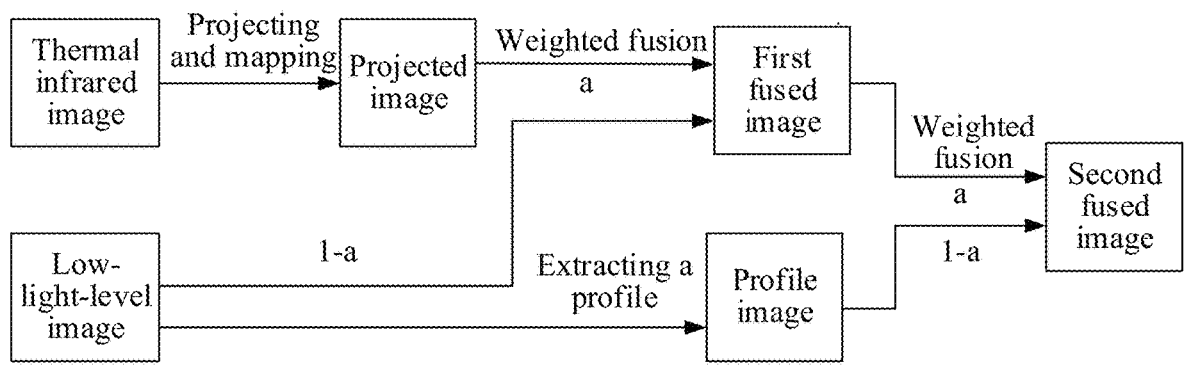
FIG. 6A is schematic flowcharts of an image fusion method according to an example of this disclosure.

FIG. 6A shows an image fusion process when the first image is taken as the reference image, taking the first image as the thermal infrared image and the second image as the low-light-level image.

Figure 5B:
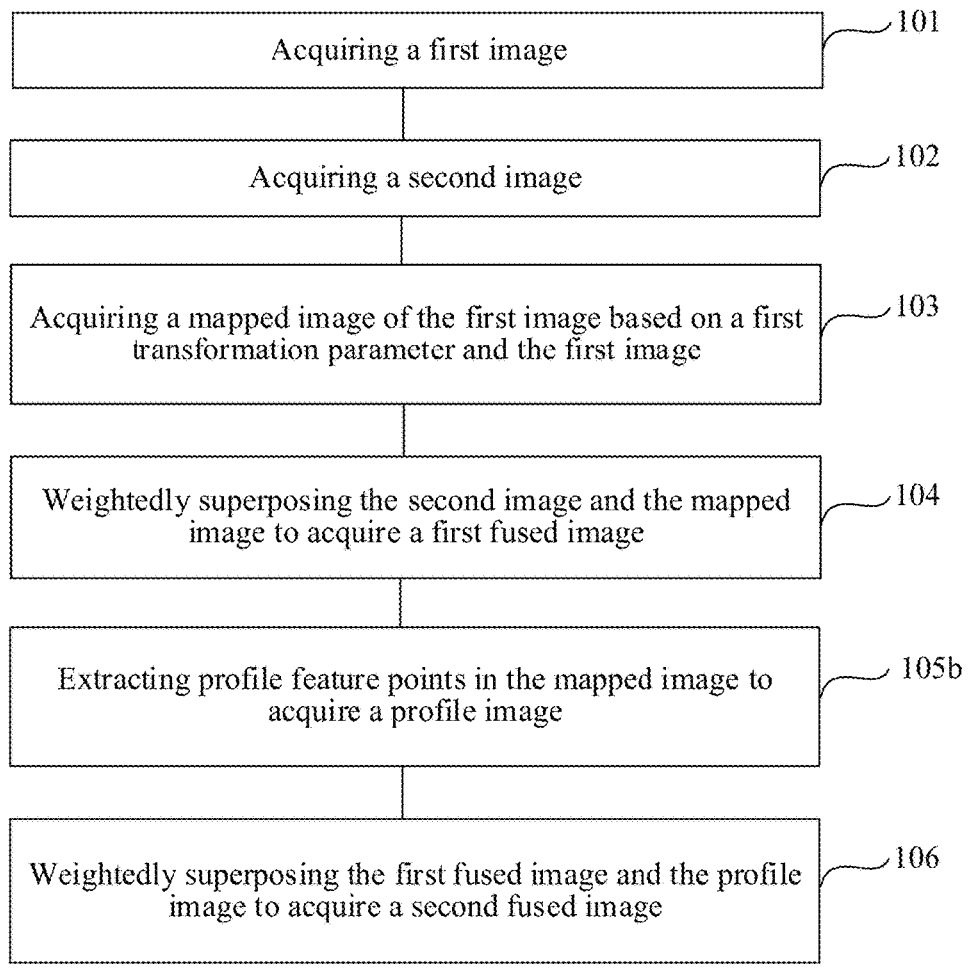
FIG. 5B is flowcharts of an image fusion method according to another example of this disclosure.

In other examples, the second image can also be used as the reference image, and the weight of the second image can be set to be greater than that of the first image (for needs of specific application, the weight of the first image can also be set to be greater than that of the second image), and the profile image is derived from the mapped image of the first image. FIG. 5B can be referred for this example. The fusion method includes following steps.

101: A first image is acquired.

102: A second image is acquired.

103: A mapped image of the first image is acquired based on a first transformation parameter and the first image.

104: The second image and the mapped image are weighted superposed to acquire a first fused image.

105b: Profile feature points in the mapped image are extracted to acquire a profile image.

106: The first fused image and the profile image are weighted superposed to acquire a second fused image.

Figure 6B:
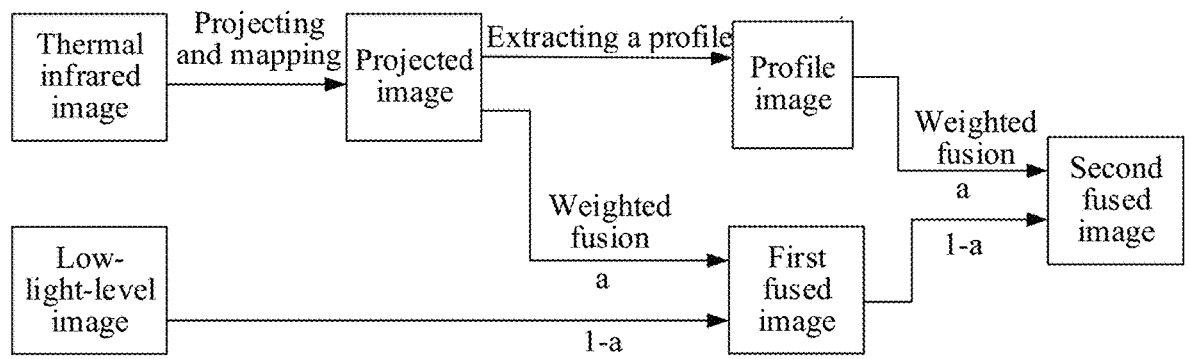
FIG. 6B is schematic flowcharts of an image fusion method according to another example of this disclosure.

FIG. 6B shows an image fusion process when the second image is taken as the reference image, taking the first image as the thermal infrared image and the second image as the low-light-level image.

Specifically, in some examples, for example a Canny edge detection algorithm can be used for detecting the feature points such as edges and profiles in the images. Extraction of profile feature points described above can be realized by retaining gray values of the profile feature points and assigning gray values of other pixels with 0. In other examples, detecting and extracting of profile feature points can also be realized by other algorithms.

In some examples, the first fused image F(x,y) and the profile image V0(x,y) can be fused with reference to a following formula:

$$E(x, y) = \begin{cases} \sum_{x=0,y=0}^{x=w,y=h}[F(x, y) \cdot a + V_0(x, y) \cdot (1-a)], & \text{if } V_0(x, y) > V1 \\ \sum_{x=0,y=0}^{x=w,y=h} F(x, y), & \text{if } V_0(x, y) \le V1 \end{cases}$$

where V1 is a gray threshold, and E(x,y) represents the second fused image, and when a gray value of a pixel in the profile image is greater than V1, it is considered as a profile feature point and fused with the first fused image, while when a gray value of a pixel in the profile image is less than V1, it is not fused with the first fused image.

Taking E(1,1) and E(1,2) as example for illustration, V1 is set to be 235, if V0(1,1) is greater than 235 and V0(1,2) is less than 235, then:

$$E(1, 1) = F(1, 1) * a + V0(1, 1) * (1-a)$$

$$E(1, 2) = F(1, 2)$$

When the unmanned aerial vehicle has various imaging devices, the fused image can have advantages of multiple imaging technologies. However, in a process of image fusion, one type of image is often used as the reference image, and another one or more types of images are used as auxiliary images. Images taken as a reference image can often be retained with more features in the fused image.

For example, in the example shown in FIG. 6a, the thermal infrared image is taken as the reference image and the profile image is taken from the low-light-level image, and the weight of the thermal infrared image can be set to be greater than that of the low-light-level image, so that more features of the thermal infrared image can be retained in the obtained fused image.

Figure 7:
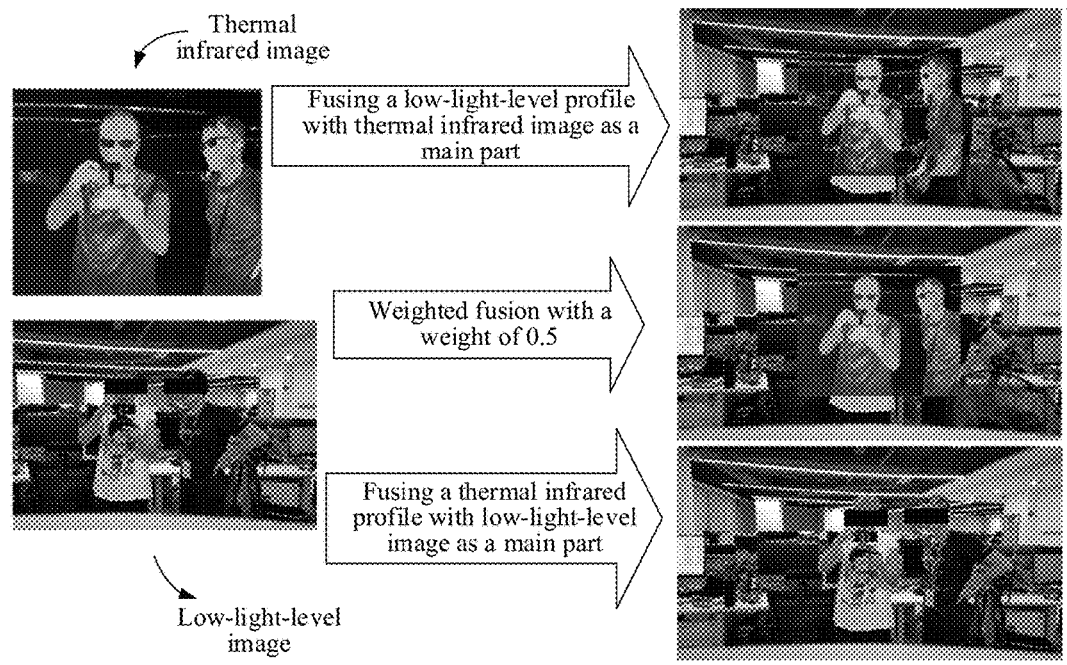
FIG. 7 is a schematic diagram of image fusion according to an example of this disclosure.

Referring to FIG. 7, a first case shown in FIG. 7 is (the first row of images) that the thermal infrared image is the reference image, the weight of the thermal infrared image is greater than that of the low-light-level image, and the profile image is derived from the low-light-level image. The acquired fused image is retained with more features from the thermal infrared image. A first case is mainly used for detection of the unmanned aerial vehicle at night, which can prominently mark heat profile information of the target and facilitate prompt of targets with dynamic heat.

A second case shown in FIG. 7 (a third row of images) is that the low-light-level image is the reference image, the weight of the low-light-level image is greater than that of the thermal infrared image, and the profile image is derived from the thermal infrared image. The acquired fusion image is retained with more features from in the low-light-level image. The second case is mainly used for reconnaissance and detection of the unmanned aerial vehicle, which requires that the image can describe a profile for target thermal imaging, and at the same time make a detected target image have more texture information.

A third case shown in FIG. 7 (intermediate image) is that the thermal infrared image and the low light level image have same weights, both of which are 0.5

In some examples of this disclosure, a weight value and/or a reference image can be changed in combination with environmental information (such as brightness and weather conditions) where the unmanned aerial vehicle is located, requirements of desired image, etc. The first image and the second image are still taken as the thermal infrared image and the low light level image for illustration.

Figure 8A:
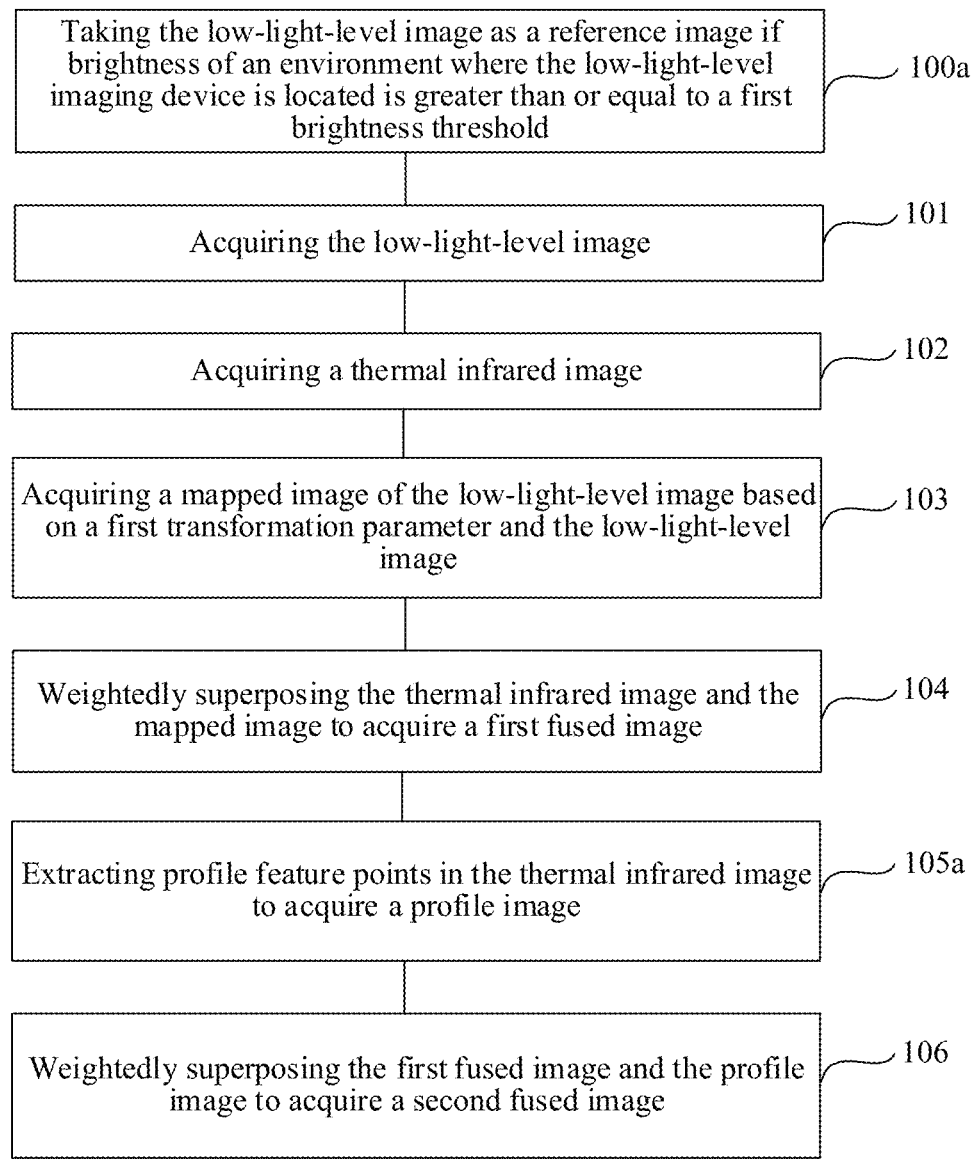
FIG. 8A is flowcharts of an image fusion method according to an example of this disclosure.
Figure 8B:
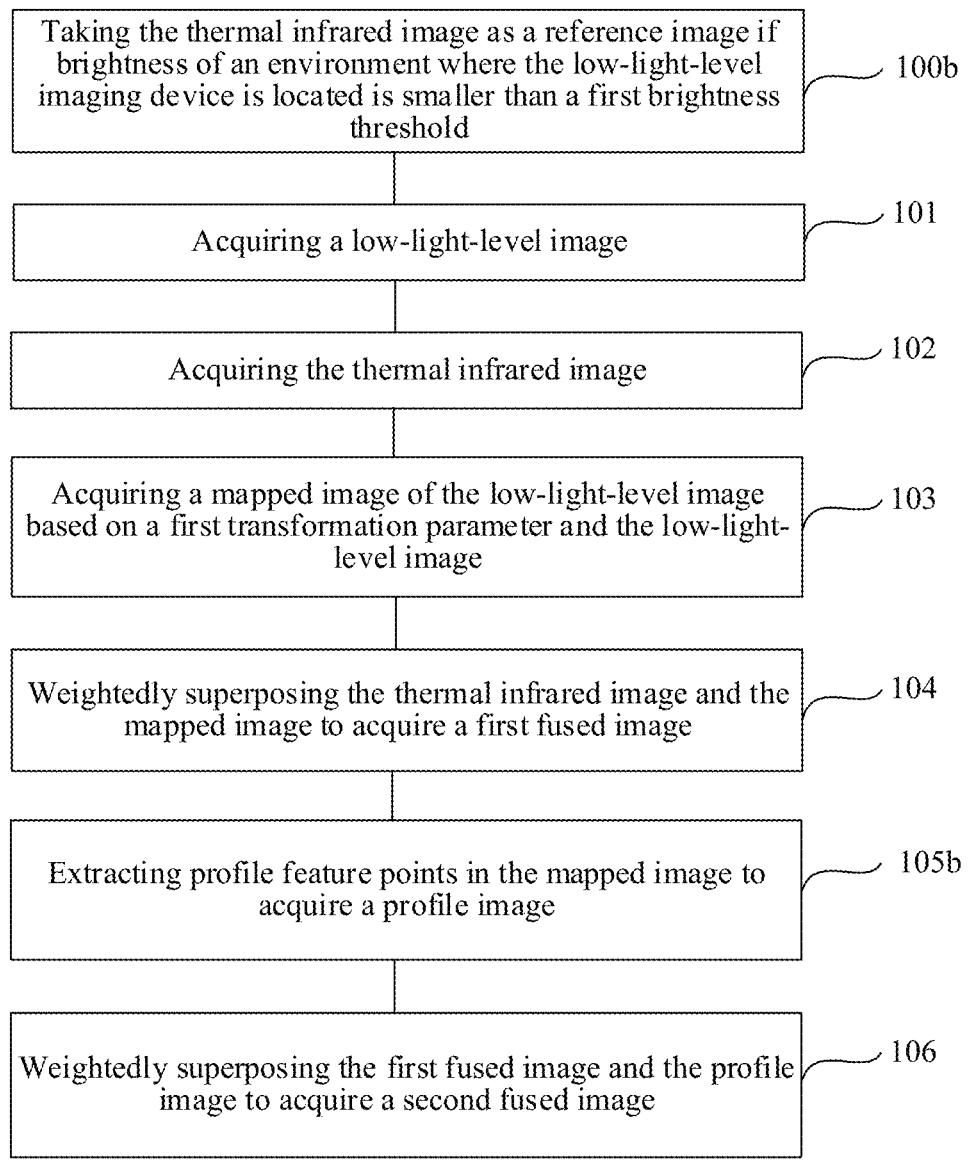
FIG. 8B is flowcharts of an image fusion method according to another example of this disclosure.

Brightness near the low-light-level imaging device can be detected. When the brightness is large and is larger than or equal to a first brightness threshold, it is indicated that an imaging condition of the low-light-level imaging device is good, and the low-light-level image can be selected as the reference image, and the profile image is derived from the thermal infrared image. When the brightness is less than the first brightness threshold, the thermal infrared image can be selected as the reference image, and the profile image is derived from the mapped image of the low light level image. FIGS. 8A and 8B are referred for this example.

Figure 8C:
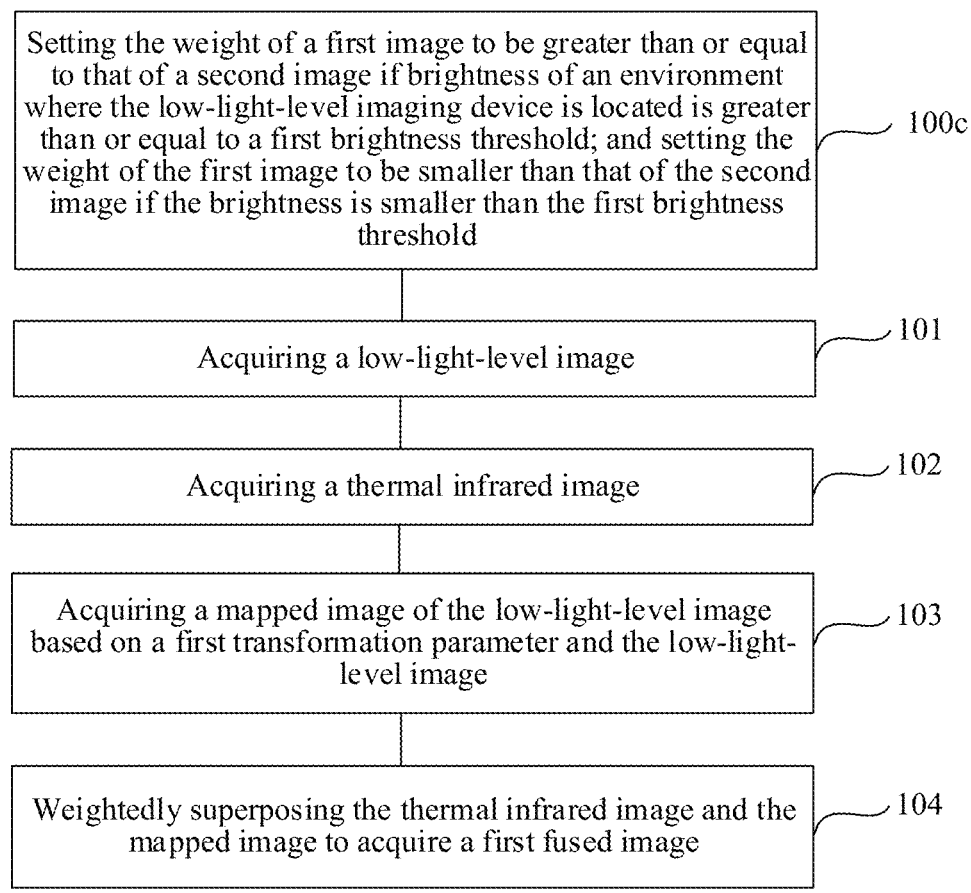
FIG. 8C is flowcharts of an image fusion method according to another example of this disclosure.

In some examples, when the brightness is greater than or equal to the first brightness threshold, the weight of the low-light-level image can be set to be greater than that of the thermal infrared image, for example, 1−a>a in FIGS. 6A and 6B. When the brightness is less than the first brightness threshold, the weight of the low-light-level image can be set to be less than that of the thermal infrared image. Reference is made to FIG. 8C.

A brightness detection device can be provided near the low-light-level imaging device to detect brightness near the low-light-level imaging device.

In some other examples, the reference image can also be determined and/or the weight can be set according to image quality of the first image and the second image, for example, which image includes more features.

If the first image contains more features than the second image, the first image is taken as the reference image, and the profile image is derived from the second image; and if the second image contains more features, the second image is taken as the reference image, and the profile image is taken from the mapped image of the first image.

In some examples, if the first image contains more features than the second image, the weight value of the first image is greater than that of the second image; and if the second image contains more features, the weight value of the second image is greater than that of the first image. For example, a is larger than 1−a in the above example.

Figure 9A:
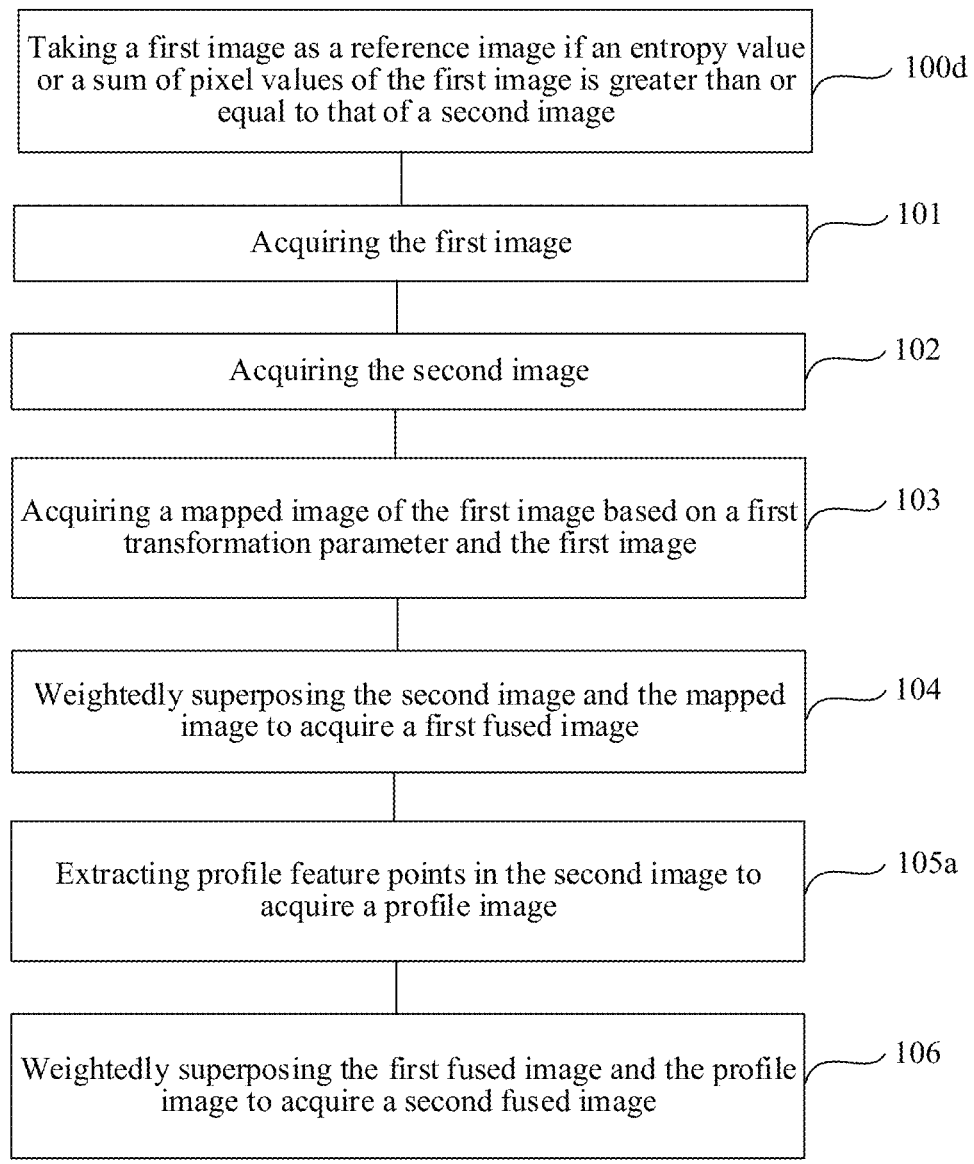
FIG. 9A is flowcharts of an image fusion method according to another example of this disclosure.
Figure 9B:
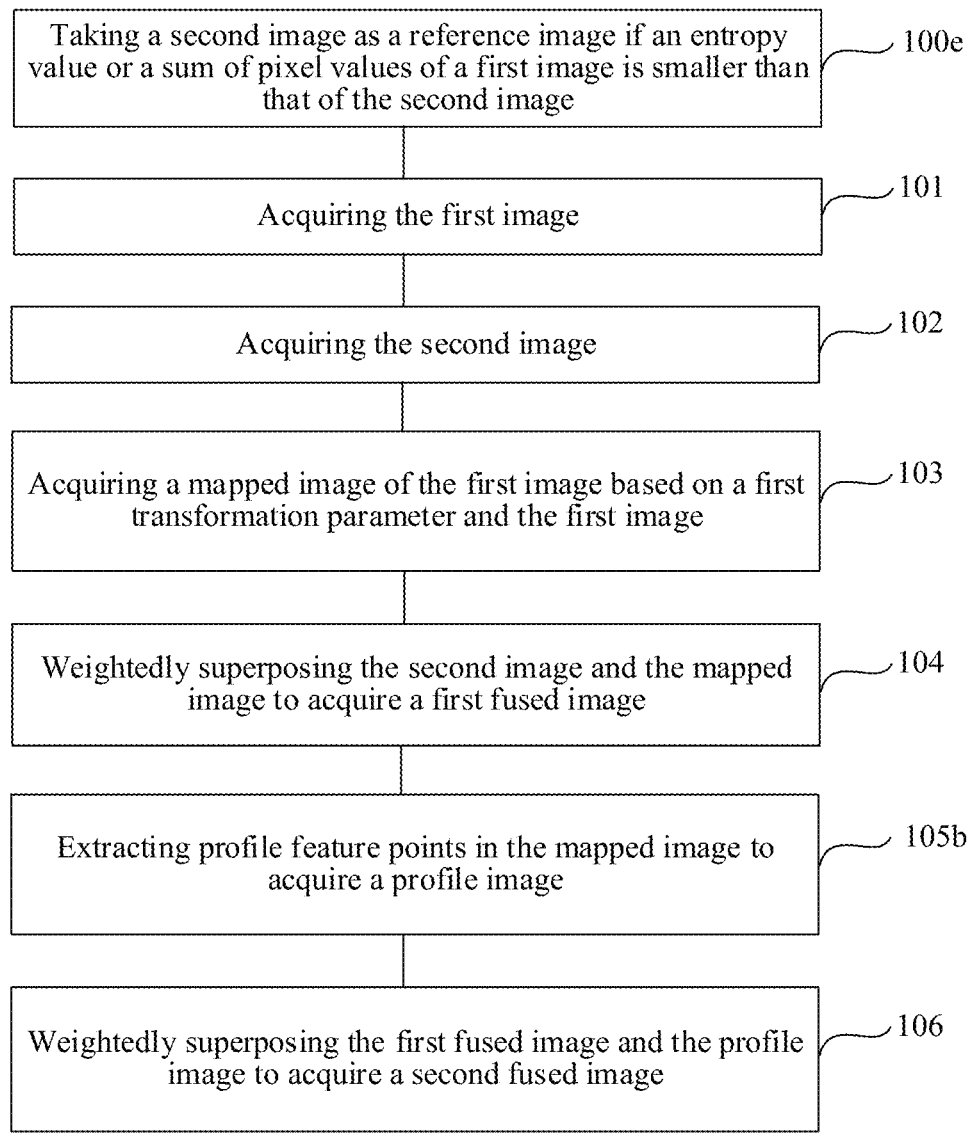
FIG. 9B is flowcharts of an image fusion method according to another example of this disclosure.
Figure 9C:
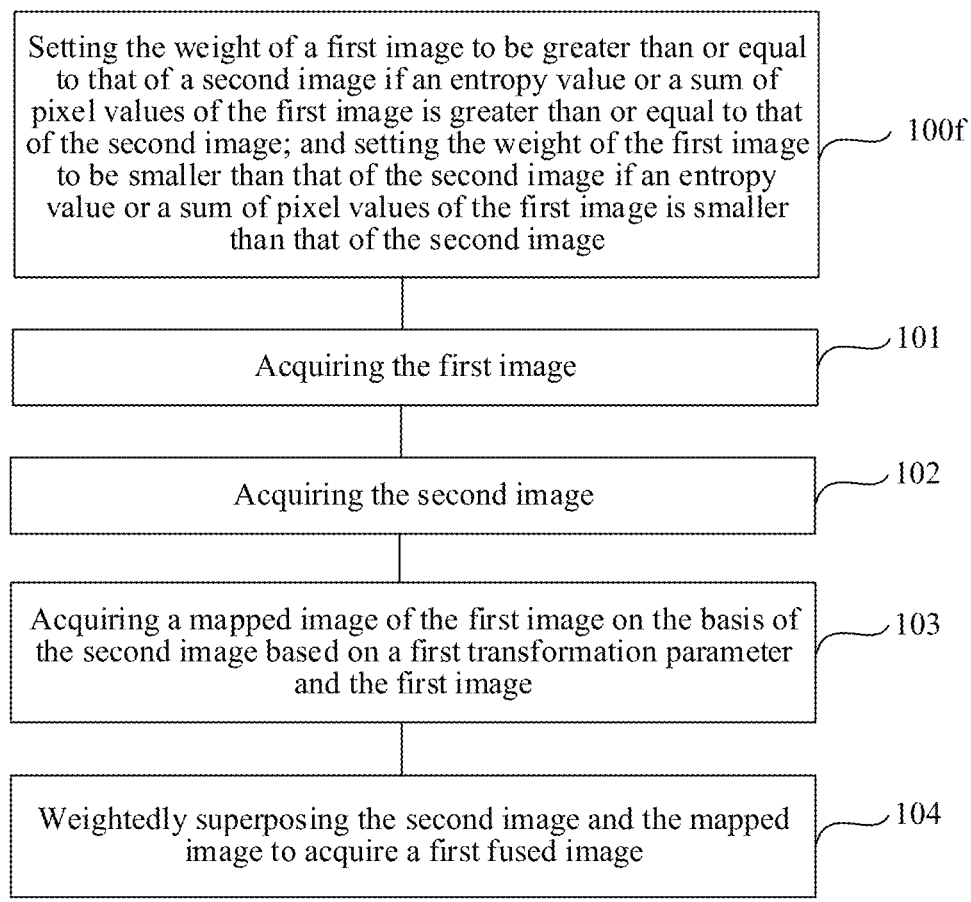
FIG. 9C is flowcharts of an image fusion method according to another example of this disclosure.

Specifically, in some examples, it can be determined whether an image contains more features by an entropy value of the image, a sum of pixel values, or the like. Taking the entropy value as an example, if the entropy value of the first image is greater than or equal to that of the second image, the first image is taken as the reference image, and/or the weight of the first image is set to be greater than that of the second image. If the entropy value of the first image is less than that of the second image, the second image is taken as the reference image, and/or the weight of the second image is set to be greater than that of the first image. FIGS. 9A and 9C are referred for this example.

Taking the sum of pixel values as an example, if a sum of pixel values of the first image is greater than or equal to a sum of pixel values of the second image, the first image is taken as the reference image, and/or the weight of the first image is set to be greater than that of the second image (for example, a>1−a). If the sum of pixel values of the first image is less than that of the second image, the second image is taken as the reference image, and/or the weight of the second image is set to be greater than that of the first image (for example, 1−a>a).

Calculation of the entropy value of the image falls within the related art, which will not be repeatedly described here. The sum of pixel values of an image is for example a sum of pixel values of respective pixels in the image.

In some examples of this disclosure, a user can select the reference image and/or set the weights of the first image and the second image through a man-machine interactive interface arranged on the unmanned aerial vehicle. This can be set according to actual applications.

Specifically, the user can select the first image as the reference image by performing a first operation on the man-machine interactive interface, or select the second image as the reference image by performing a second operation on the man-machine interactive interface. Alternatively, the user adjusts the weight of the first image or the second image by performing a third operation on the man-machine interactive interface.

Figure 10A:
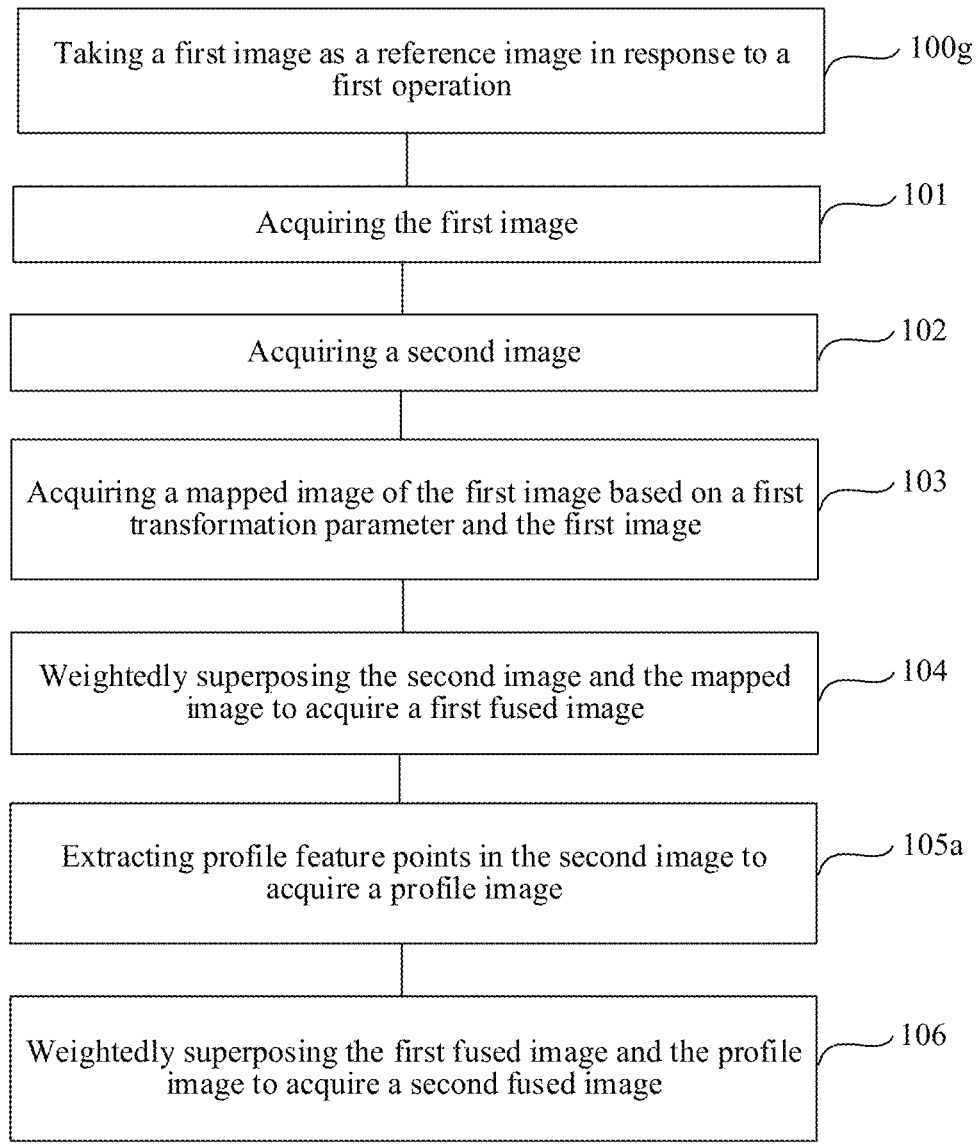
FIG. 10A is flowcharts of an image fusion method according to another example of this disclosure.
Figure 10B:
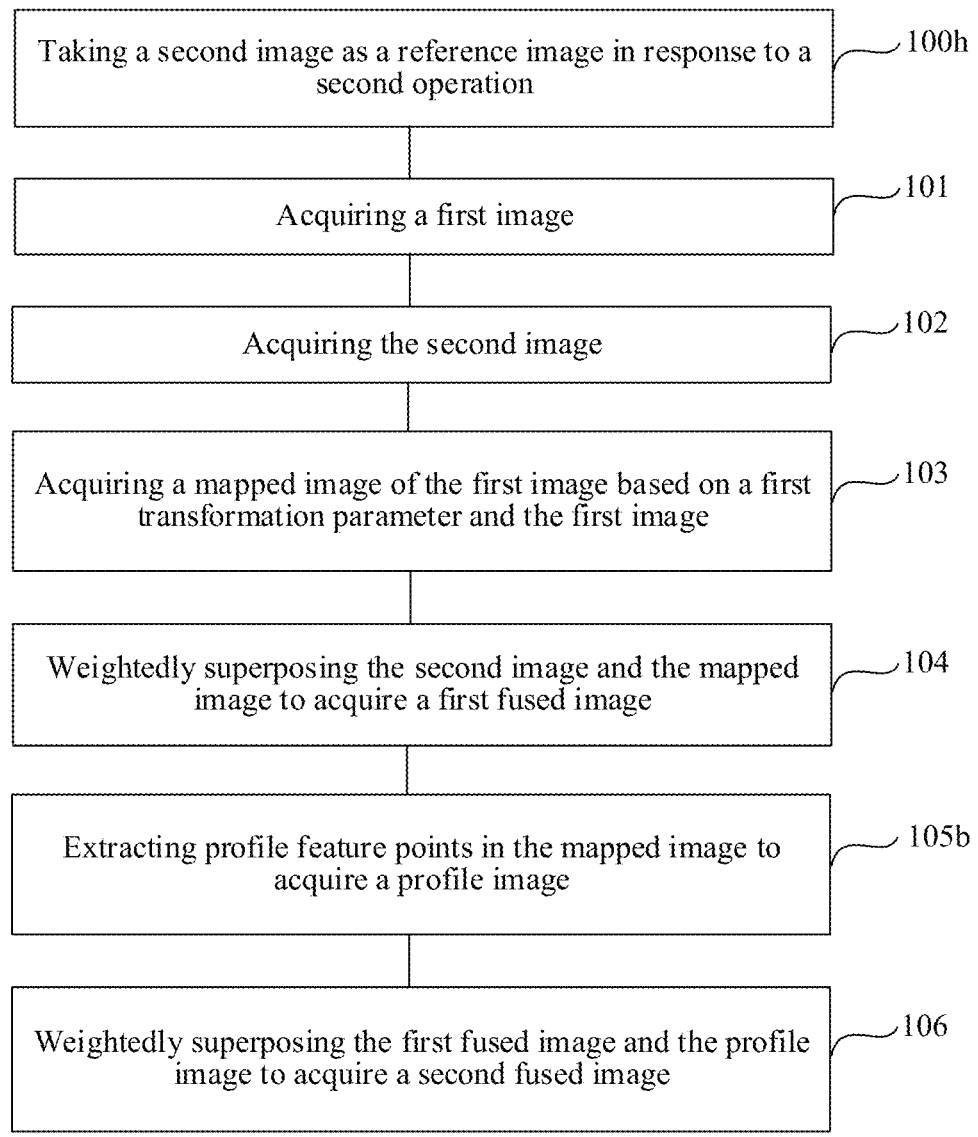
FIG. 10B is flowcharts of an image fusion method according to another example of this disclosure.
Figure 10C:
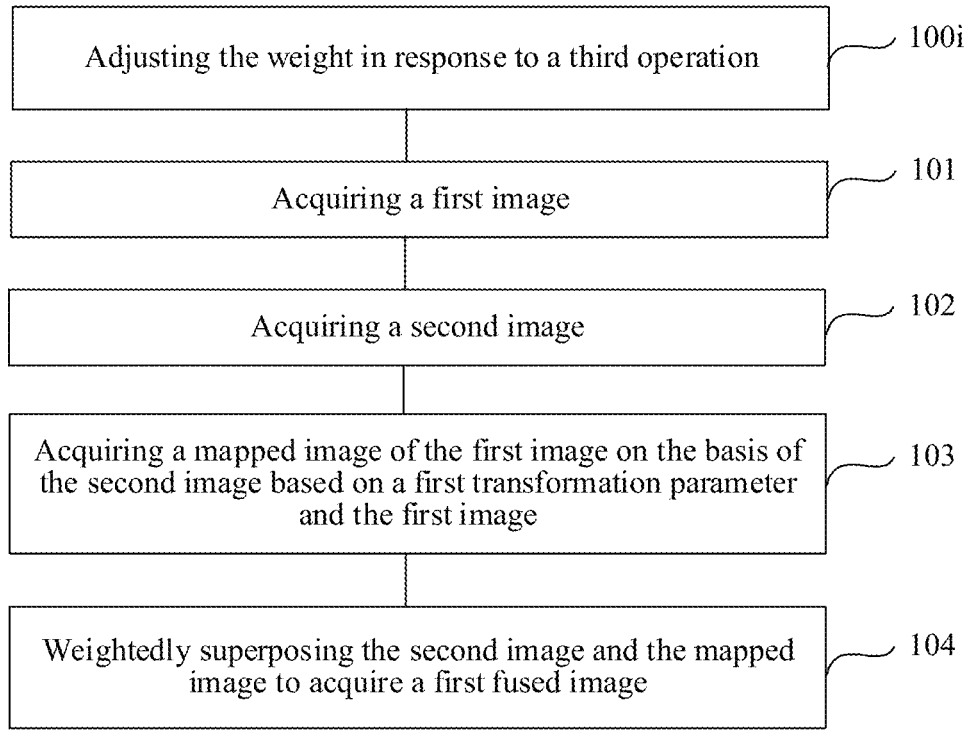
FIG. 10C is flowcharts of an image fusion method according to another example of this disclosure.

When the user performs the first operation, the unmanned aerial vehicle takes the first image as the reference image in response to the first operation and FIG. 10A can be referred for this example. When the user performs the second operation, the unmanned aerial vehicle takes the second image as the reference image in response to the second operation and FIG. 10B can be referred for this example. When the user performs the third operation, the unmanned aerial vehicle adjusts the weight of the first image or the second image in response to the third operation and FIG. 10C can be referred for this example.

It should be noted that: An image related to the first image can be with a same weight as that of the first image. For example, a projected image and the profile image of the first image can be with a same weight as that of the first image, and the weight of the first fused image can also be the same as that of the first image in a case that a large part of the first fused image is the same as the first image.

An image related to the second image can be with a same weight as that of the second image. For example, a projected image and the profile image of the second image can be with a same weight as that of the second image, and the weight of the first fused image can also be the same as that of the second image in a case that a large part of the first fused image is the same as the second image.

Figure 11:
FIG. 11 is a schematic diagram of a man-machine interactive interface according to an example of this disclosure.
Figure 12:
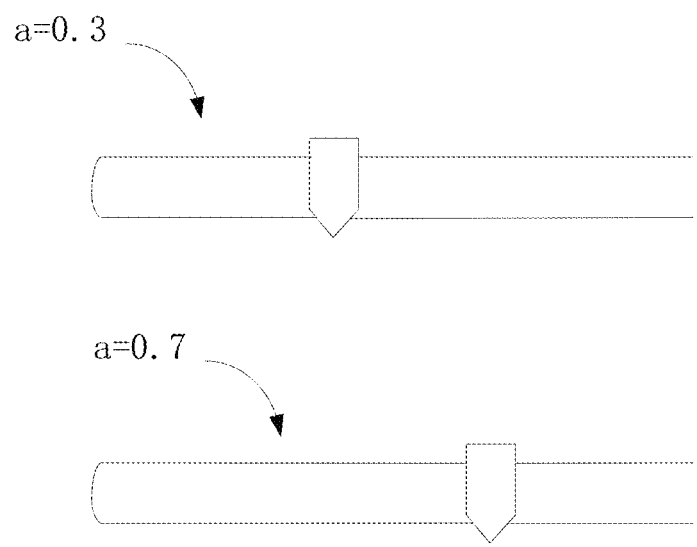
FIG. 12 is a schematic diagram of a man-machine interactive interface according to an example of this disclosure.

The first operation, the second operation and the third operation can be any operation that enables the unmanned aerial vehicle to receive signals. Illustratively, the first operation is for example a click operation of clicking "a selection box of the first image" on the touch screen shown in FIG. 11, and the second operation is for example a click operation of clicking "a selection box of the second image" on the touch screen shown in FIG. 11. The third operation is, for example, an operation of dragging a progress bar.

In practical applications, the third operation can be used for setting the weight a of the first image, and the weight of the second image is obtained by calculating 1−a. For example, when the user drags a drag bar to stop at a certain point at the progress bar, the weight a of the first image is set.

Because the unmanned aerial vehicle usually acquires images in motion, images acquired at certain intervals are quite different. In order to fuse the first image and the second image better, it is necessary to keep consistency of the images acquired by them as much as possible. In some examples, times when the first image and the second image are acquired are substantially the same.

Firstly, a time stamp of the first image and a time stamp of the second image can be acquired. If the time stamps of the two images are not synchronized, for example, the time stamp of the first image is later than the time stamp of the second image by a first time T, the first image can be obtained with delay of the first time T, so that the unmanned aerial vehicle can obtain the first image and the second image synchronously.

If the time stamp of the second image is later than the time stamp of the first image by a first time T, the second image can be obtained with delay of the first time T, so that the unmanned aerial vehicle can obtain the first image and the second image synchronously.

It should be noted that: The reference numbers of the above steps are only used to identify the steps, and are not used to indicate a sequence of the steps. In addition to an order of text presentation, there can be other orders between steps.

A computer-readable storage medium is further provided in an example of this disclosure, which has computer-executable instructions stored therein, which are executed by one or more processors, such as the processor 30 in FIG. 1, so that the one or more processors can execute the image fusion method in any of the above method examples.

A computer program product is further provided in an example of this disclosure, which includes a computer program stored on a nonvolatile computer-readable storage medium, and the computer program includes program instructions, which, when executed by a machine, cause the machine to perform the image fusion method of any of the above examples.

Finally, it should be noted that: the foregoing examples are merely used for describing the technical solutions of the present disclosure, but are not intended to limit the present disclosure. Under the ideas of the present disclosure, the technical features in the foregoing examples or different examples may also be combined, the steps may be performed in any order, and many other changes of different aspects of the present disclosure also exists as described above, and these changes are not provided in detail for simplicity. Although the present disclosure is described in detail with reference to the foregoing examples, it should be appreciated by a person skilled in the art that, modifications may still be made to the technical solutions described in the foregoing examples, or equivalent replacements may be made to the part of the technical features; and these modifications or replacements will not cause the essence of corresponding technical solutions to depart from the scope of the technical solutions in the examples of the present disclosure.

What is claimed is:

1. An image fusion method, comprising:
    acquiring a first image;
    acquiring a second image;
    acquiring a mapped image of the first image based on a first transformation parameter and the first image, the first transformation parameter being configured to characterize a spatial transformation relationship between the first image and the second image; and
    weightedly superposing the second image and the mapped image to acquire a first fused image.

2. The image fusion method according to claim 1, further comprising:
    extracting profile feature points in the second image to acquire a profile image;
    or,
    extracting profile feature points in the mapped image to acquire a profile image.

3. The image fusion method according to claim 2, further comprising:
    weightedly superposing the first fused image and the profile image to acquire a second fused image.

4. The image fusion method according to claim 3, wherein the first image is a low-light-level image acquired by a low-light-level imaging device, and the second image is a thermal infrared image acquired by a thermal infrared imaging device;
    or,
    the first image is a thermal infrared image acquired by a thermal infrared imaging device, and the second image is a low-light-level image acquired by a low-light-level imaging device.

5. The image fusion method according to claim 4, further comprising:
    acquiring a brightness of an environment where the low-light-level imaging device is located,
    wherein the method further comprises:
    in response to the brightness being greater than or equal to a first brightness threshold, taking the low-light-level image as a reference image, the profile image comprising profile feature points in the thermal infrared image; or
    in response to the brightness being lower than the first brightness threshold, taking the thermal infrared image as a reference image, the profile image comprising profile feature points in the mapped image of the low-light-level image.

6. The image fusion method according to claim 4, further comprising:
    determining weights for the weightedly superposing based on the brightness of the environment where the low-light-level imaging device is located.

7. The image fusion method according to claim 2, further comprising:
    taking the first image as a reference image in response to a first operation, the profile image comprising the profile feature points in the second image;
    or,
    taking the second image as a reference image in response to a second operation, the profile image comprising the profile feature points in the mapped image.

8. The image fusion method according to claim 2, further comprising:
    taking the first image as a reference image in response to the first image and the second image satisfying a first condition, the profile image comprising the profile feature points in the second image;
    or,
    taking the second image as a reference image in response to the first image and the second image satisfying a second condition, the profile image comprising profile feature points in the mapped image,
    wherein the first condition comprises one of following conditions:
    an entropy value of the first image is greater than or equal to an entropy value of the second image; and
    a sum of pixel values of the first image is greater than or equal to a sum of pixel values of the second image, and
    wherein the second condition comprises one of following conditions:
    the entropy value of the first image is smaller than the entropy value of the second image; and
    the sum of pixel values of the first image is smaller than the sum of pixel values of the second image.

9. The image fusion method according to claim 1, further comprising:
    adjusting weights for the weightedly superposing in response to a third operation.

10. The image fusion method according to claim 1, further comprising:
    determining weights for the weightedly superposing in response to the first image satisfying a first condition, or the second image satisfying a second condition,
    wherein the first condition comprises one of following conditions:
    an entropy value of the first image is greater than or equal to an entropy value of the second image; and
    a sum of pixel values of the first image is greater than or equal to a sum of pixel values of the second image, and
    wherein the second condition comprises one of following conditions:
    the entropy value of the first image is smaller than the entropy value of the second image; and
    the sum of pixel values of the first image is smaller than the sum of pixel values of the second image.

11. The image fusion method according to claim 1, wherein the first transformation parameter comprises a projection matrix, which is:

$$H_L = \begin{bmatrix} m_0, m_1, (am_2 + bL) \\ m_3, m_4, (cm_5 + dL) \\ m_6, m_7, m_8 \end{bmatrix}$$

wherein $m_0$, $m_1$, $m_2$, $m_3$, $m_4$, $m_5$, $m_6$, $m_7$, $m_8$ a, b, c, and d are constants, and L is a distance from a target to an imaging device.

12. An electronic device, comprising:
    a processor and a memory communicatively connected to the at least one processor, wherein
    the memory storing instructions executable by the at least one processor, the instructions being executed by the at least one processor, to enable the at least one processor to perform following steps:

acquiring a first image;

acquiring a second image;

acquiring a mapped image of the first image based on a first transformation parameter and the first image, the first transformation parameter being configured to characterize a spatial transformation relationship between the first image and the second image; and weightedly superposing the second image and the mapped image to acquire a first fused image.

13. The electronic device according to claim 12, wherein the processor is further enabled to perform:

extracting profile feature points in the second image to acquire a profile image;

or, extracting profile feature points in the mapped image to acquire a profile image.

14. The electronic device according to claim 13, wherein the processor is further enabled to perform:

weightedly superposing the first fused image and the profile image to acquire a second fused image.

15. The electronic device according to claim 13, wherein the processor is further enabled to perform:

taking the first image as a reference image in response to the first image and the second image satisfying a first condition, the profile image comprising the profile feature points in the second image;

or, taking the second image as a reference image in response to the first image and the second image satisfying a second condition, the profile image comprising profile feature points in the mapped image, wherein the first condition comprises one of following conditions:

an entropy value of the first image is greater than or equal to an entropy value of the second image; and a sum of pixel values of the first image is greater than or equal to the sum of pixel values of the second image, and wherein the second condition comprises one of following conditions:

the entropy value of the first image is smaller than the entropy value of the second image; and the sum of pixel values of the first image is smaller than the sum of pixel values of the second image.

16. The electronic device according to claim 12, wherein the processor is further enabled to perform:

taking the first image as a reference image in response to a first operation, the profile image comprising the profile feature points in the second image;

or, taking the second image as a reference image in response to a second operation, the profile image comprising the profile feature points in the mapped image.

17. The electronic device according to claim 12, wherein the processor is further enabled to perform:

adjusting weights for the weightedly superposing in response to a third operation.

18. An unmanned aerial vehicle, comprising:

a fuselage provided with a first imaging device and a second imaging device, the first imaging device being used for acquiring a first image and the second imaging device being used for acquiring a second image;

an arm being connected with the fuselage;

a power device arranged on the arm and for providing power for flying of the unmanned aerial vehicle; and a processor and a memory communicatively connected to the at least one processor, wherein the memory storing instructions executable by the at least one processor, the instructions being executed by the at least one processor, to enable the at least one processor to perform following steps:

acquiring a first image;

acquiring a second image;

acquiring a mapped image of the first image based on a first transformation parameter and the first image, the first transformation parameter being configured to characterize a spatial transformation relationship between the first image and the second image; and weightedly superposing the second image and the mapped image to acquire a first fused image.

19. A non-transitory computer readable storage medium, wherein the non-transitory computer readable storage medium stores computer-executable instructions to cause the processor to perform following steps:

acquiring a first image;

acquiring a second image;

acquiring a mapped image of the first image based on a first transformation parameter and the first image, the first transformation parameter being configured to characterize a spatial transformation relationship between the first image and the second image; and weightedly superposing the second image and the mapped image to acquire a first fused image.

* * * * *